Aug. 12, 1947.  G. G. ELLNER  2,425,672
RAY-EMISSION MEANS
Filed April 23, 1943  4 Sheets-Sheet 1
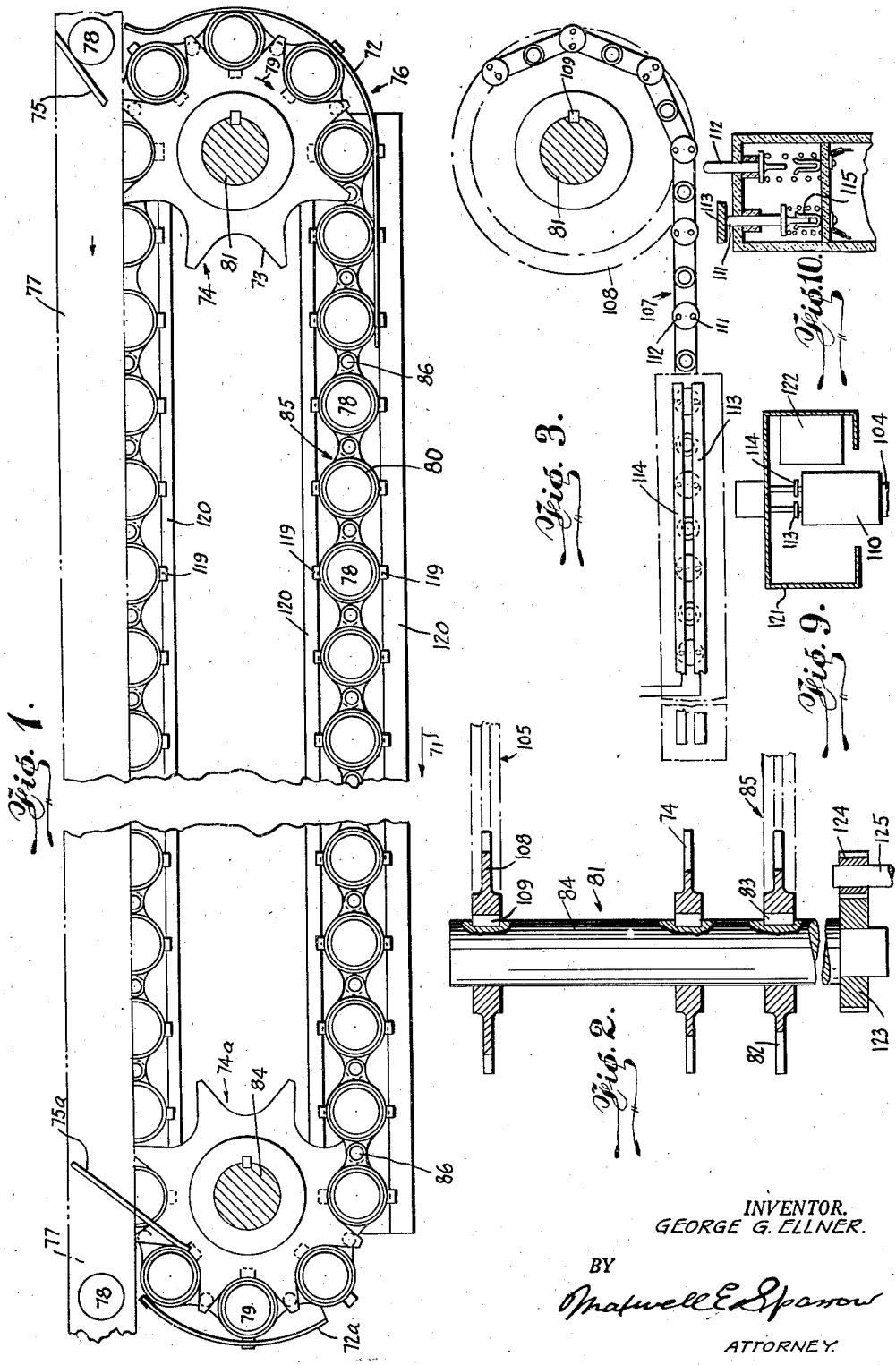
INVENTOR.
GEORGE G. ELLNER.
BY
ATTORNEY.

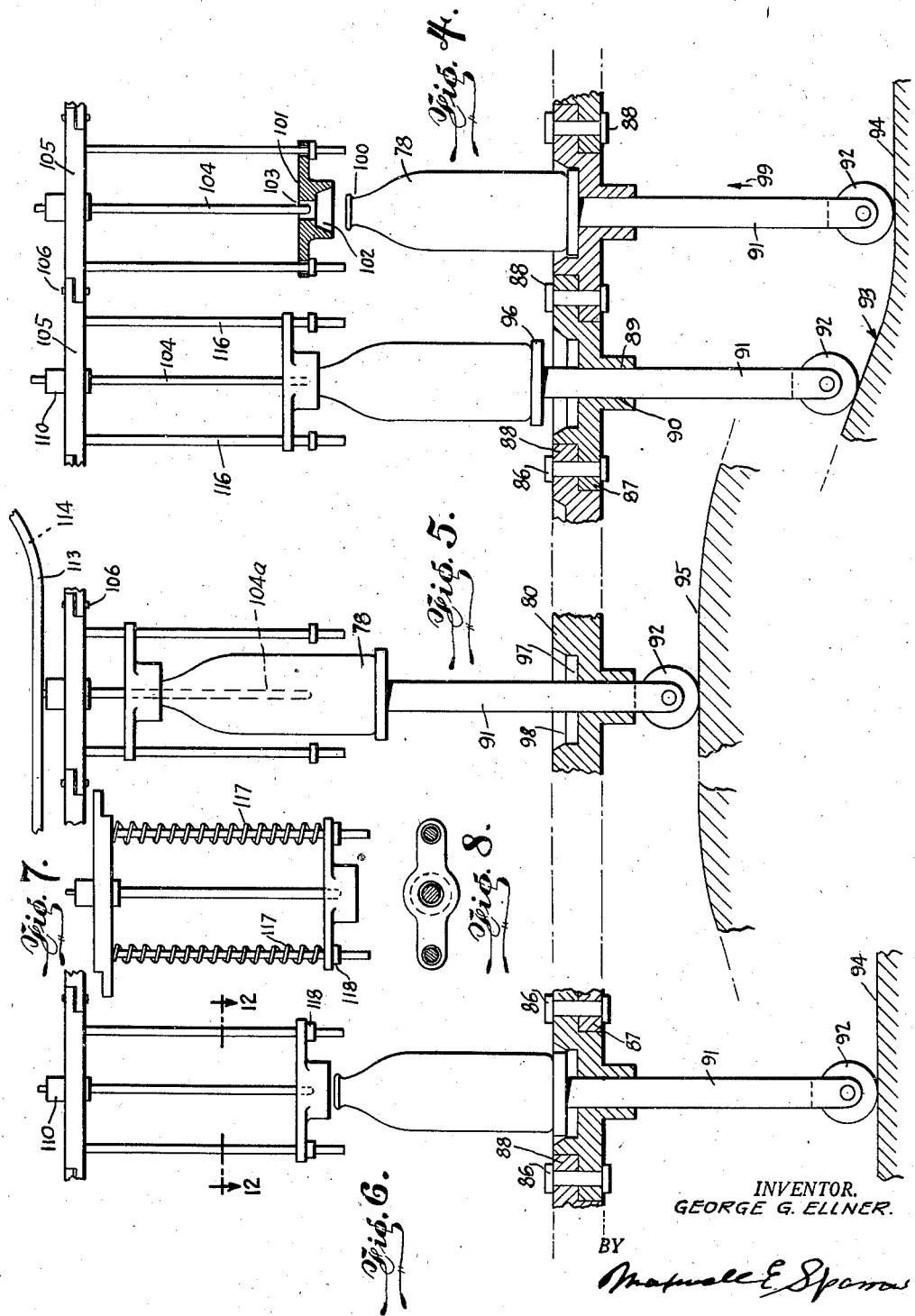

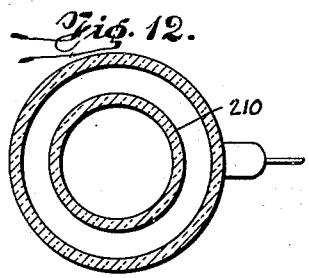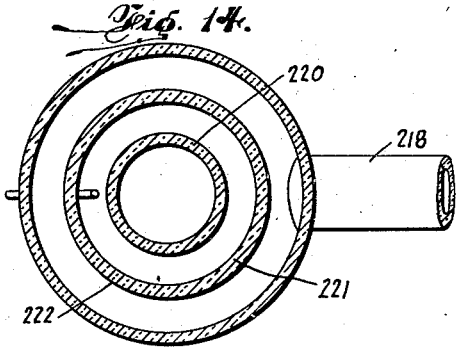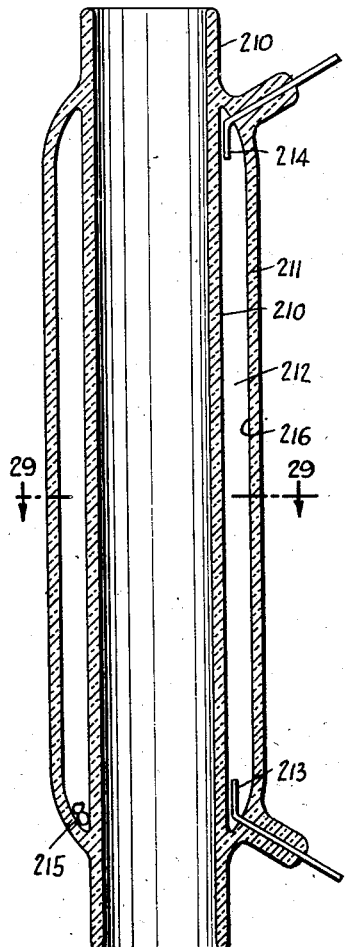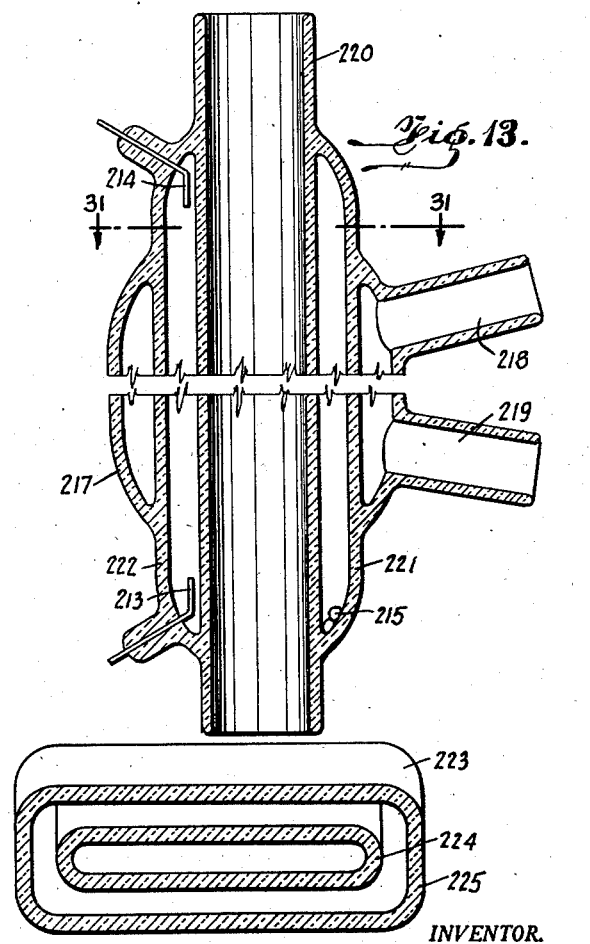

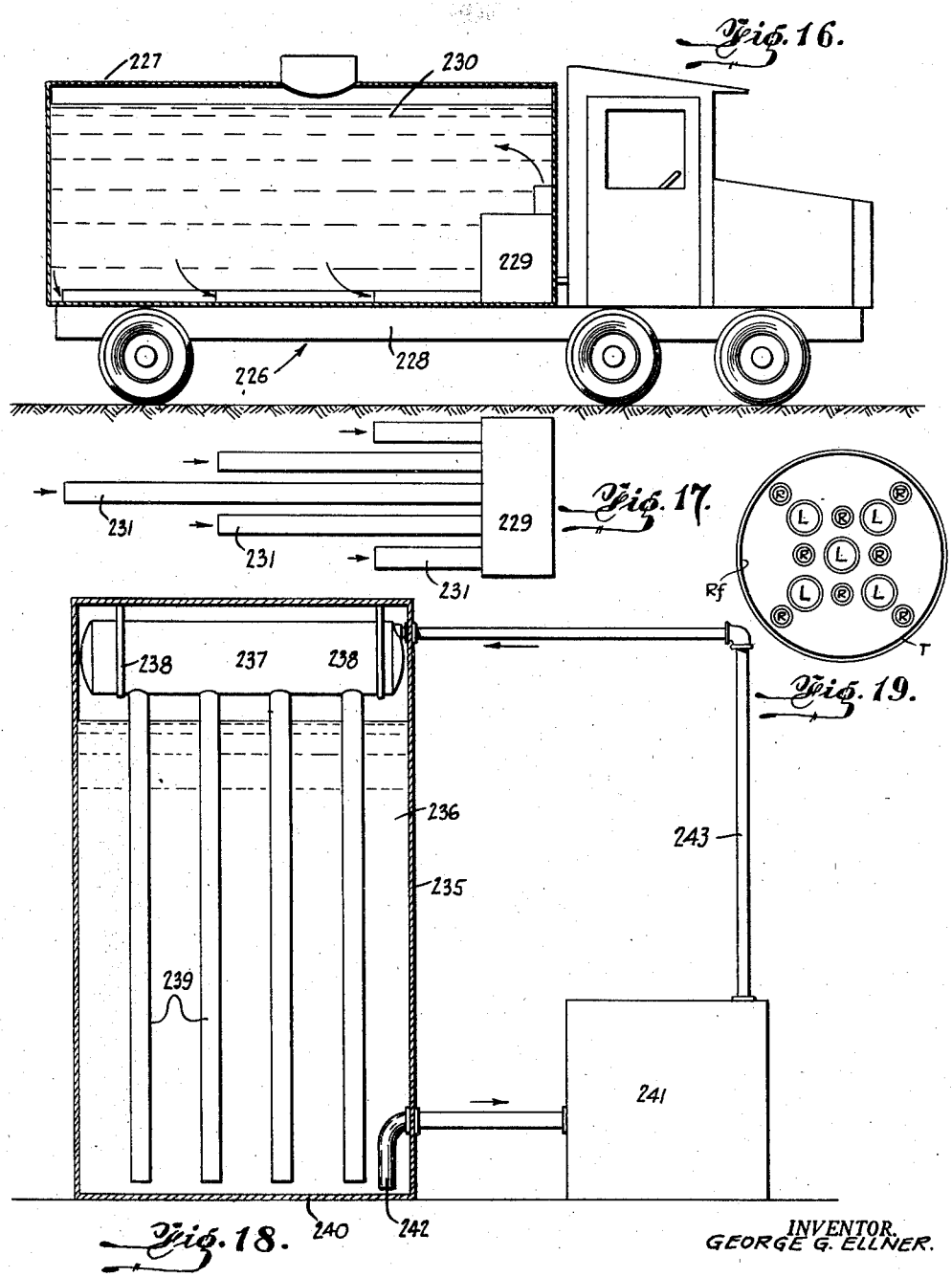

Patented Aug. 12, 1947

2,425,672

UNITED STATES PATENT OFFICE 2,425,672

RAY-EMISSION MEANS

George G. Ellner, Long Island, N. Y.

Application April 23, 1943, Serial No. 484,156

1 Claim. (Cl. 250—43)

This invention relates to the application of ray-emission means for treating or sterilizing surfaces and contents of receptacles, containers, tanks, etc., for destroying or appreciably reducing the number of bacteria, yeasts, molds, algae, virus and other micro-organisms or other undesirable germs, and for other germicidal or sterilizing purposes, and to possibly replace pasteurization, heat or chemical sterilization, or fumigation.

It is proposed to accomplish these objectives by (a) inserting the ray-emission means within the container, tank, room, or other confined or localized area; thus subjecting the surfaces to be treated to the effective emissions or radiations of the source; (b) injecting the ray-emission means into the liquid or other substance, to be treated.

It has heretofore been the practice of sterilizing utensils, containers, enclosures, etc., by employing steam, hot water, chemicals, or gases. These means are frequently inexpedient, uneconomical, damaging to the surfaces treated and hazardous to the operators applying such treatment. Another disadvantage of these sterilizing means is that they may react chemically or otherwise with the contacted surfaces and thereby contaminate or otherwise alter or effect the taste, odor, food value, vitamin content, appearance, or chemical and other properties of the fluid or other substance subsequently coming in contact therewith.

It is generally known that in sterilizing food utensils, containers and other equipment in food, beverage, medical, biological, and other industries, the resultant effectiveness of chlorine and other sterilizing compounds is markedly reduced in the presence of organic and other foreign matter.

Another disadvantage of present sterilizing practices is the failure to effectively treat the environment surrounding the surfaces to which chemical or other sterilizing media are applied, particularly in that they do not sterilize the said environment. The present practice of employing a chlorine or other chemical solution as a sterilizing treatment or final rinse in milk bottles or other containers and closures for same is costly, hazardous and objectionable since the uniform control of the prescribed concentrations of such solutions is difficult to maintain; with the result that it is either below the required concentration to be effective as a bactericide, or so highly concentrated as to adversely affect the odor, taste and other characteristics of the fluid or other substance subsequently stored in such container.

The use of steam or water for sterilization purposes is objectionable in that it is not only costly as regards time, labor and fuel, but also in that they may leave a residual condensate which dilutes or otherwise affects the fluid or substance subsequently placed within or without the vessel or other equipment; such condensate being conducive to the growth of yeast, mold, bacteria, and etc.

In the pasteurization of certain fluids and the sterilization of certain fluids and other substances, the temperatures customarily employed for prescribed periods of time are inadequate to destroy thermophylic and other organisms resulting in subsequent premature spoilage.

It is, therefore, an object of the present invention to reduce or eliminate the disadvantages or objectional features of sterilizing practices heretofore employed.

It is another object of the present invention to efficiently utilize in a practical and economical and safe manner ray-emission means for maintaining in good normal condition, sterilizing or otherwise treating surfaces of enclosed or exposed areas; fluids or other substances within or about a vessel or other equipment; the environment therewithin and therewithout, as well as the surfaces of the equipment itself.

It is a further object of this invention to utilize ray-emission means in an effective manner for preventing the fermentation, molding, bacterial, algaeic or other spoilage or changes in and maintaining intact in good condition for appreciable periods, fluids or other substances, stored, contained, transported, piped, packaged, or bottled.

Yet a further object of the present invention is to increase the vitamin D content in certain fluids and other substances by suitable and effective application of ray-emission means, in a safe, economical and non-hazardous manner, while such fluid or substance is in the process of being stored, contained, transported, piped, packaged or bottled.

A still further object of the present invention is to provide ray-emission means adapted to be installed permanently or temporarily in tanks, vehicles, compartments, and other containers or receptacles, in such manner as to provide a sterile environment surrounding the substance to be treated as well as to irradiate the surface of such substance, without being in direct contact therewith.

The above and other objects and advantages of the invention will appear as the description proceeds. To enable others skilled in the art so fully to comprehend the underlying features thereof that they may embody the same by the numerous modifications in structure and relation contemplated by this invention, drawings depicting certain forms of the invention have been annexed as a part of this disclosure, and in such drawings, like characters of reference denote corresponding parts throughout all of the views, of which:

Fig. 1 is a diagrammatic sectional view of a conveyer system incorporating bactericidal ultraviolet lamps, intermittently lighted;

Fig. 2 is a diagrammatic elevational view partly in section of one of the turrets;

Fig. 3 is a partial plan view showing a link belt with the bactericidal lamp units and a portion of the electrical contact rails;

Figs. 4, 5 and 6 are enlarged views showing plungers in various stages of operation, lifting bottles into operative positions and withdrawing the same;

Fig. 7 illustrates a modified form of bottle and lamp carrier link;

Fig. 8 is a sectional view taken along line 12—12 of Fig. 6;

Fig. 9 is a cross-sectional view illustrating a hood protecting the electrical contact rails;

Fig. 10 is an enlarged partial sectional view of the contact points of one of the lamp sockets;

Fig. 11 is a cross-sectional view of a lamp in modified form having a fluid central passage;

Fig. 12 is a cross-sectional view taken along line 29—29 of Fig. 11;

Fig. 13 is a cross-sectional view of a modified form of lamp having two fluid chambers, with lamp chamber therebetween;

Fig. 14 is a cross-sectional view taken along line 31—31 of Fig. 13;

Fig. 15 is a cross-section through a lamp flattened into substantially rectangular shape;

Fig. 16 is a partial cross-sectional view through a tank truck utilizing ray-emission lamps;

Fig. 17 is a top view of the arrangement of ray-emission lamps shown in Fig. 16;

Fig. 18 is a cross-sectional view of stationary tank utilizing ray-emission lamps in another form; and Fig. 19 is a diagrammatic view of a further form of the invention.

Fig. 1 illustrates diagrammatically a section of the endless link belt bottle carrier 85, comprising the individual connecting links 80 movable about the turret 81 by means of a sprocket wheel 82 keyed as at 83 to the shaft 84 of turret 81. These links 80 are hingedly connected by pins 86. Each individual link 80 is provided with a lower projection 87 at one end and an upper projection 88 at its other end (Figs. 4, 6). In forming a continuous chain or link belt 85, the upper projection 88 is positioned over lower portion 87 of the adjacent link and securely held by the said pin 86, thus forming an endless chain belt. Each link 80 is also provided with a hub 89 having a central orifice 90 through which passes a plunger 91. The lower end of plunger 91 is provided with a roller 92 which is in continuous engagement with the endless track 93 having a low portion 94 and a high portion 95 for reasons later on described. The opposite end of plunger 91 is provided with a bottle-carrying disc 96 which normally is located within the recess of the link 80. This recess is in two portions, namely, a lower portion 97 and an upper bevelled portion 98, the bevel of which being provided for guiding the bottle 78 coming off the conveyor 77, centrally upon the disc 96 (Fig. 1). As the plunger 91 (Figs. 4 to 6) in its travel, moves upward in the direction of the arrow 99, it causes the neck 100 of bottle 78 to engage a sliding guide member 101, particularly engaging this guide member 101 within the funnel-shaped recess 102. Guide member 101 has centrally located an opening 103 through which the ray-emitting lamp 104 will pass into the interior of bottle 78 as the plunger 91 has reached its uppermost position of its travel on track 93 (as shown in Fig. 5).

Each ray-emitting lamp 104 is suspended from a link 105 which is pinned at 106 to form a continuous chain 107 travelling around a sprocket 108 (Fig. 3). Sprocket 108 is keyed at 109 to shaft 81 (Fig. 2). Referring to Figs. 3, 4, 5, 6, 10—centrally located on link 105 is a lamp socket 110 provided with two switch contact points 111, 112. As plunger 91 reaches the highest point of its travel shown in Fig. 5, the switch contact points 111, 112 are brought into engagement with two electrically-charged rails 113, 114. Rails 113, 114 exert a pressure against the contact points 111, 112 as clearly shown in Fig. 10, thus causing said contact points to engage knife switches 115, and thus causing lamps 104a to emit rays. Tracks 113, 114 are located only over the high position 95 of rail 93, thus causing lamps 104a to be energized only while bottles 78 travel along the high portion 95 of the continuous track 93. Two rods 116 guide the sliding members 101 which are shown as retaining their lowered position by the action of gravity (Figs. 4, 5, 6). If desired, however, springs 117 (Fig. 7) may be employed to urge the guiding member downwardly into its lower position against stops 118.

The individual links 80 (Fig. 1) are preferably provided with lugs 119 resting on rails 120 for the purpose of supporting the bottle carrier 85. To assure the proper guiding of the bottle 78 from conveyer 77 onto the bottle carrier 85, a transverse member 75 is positioned diagonally across conveyer belt 77, causing bottle 78 to roll against sprocket 74 having notches 73 to accommodate bottle 78. To prevent bottle 78 from falling off bottle carrier 85, an apron 72 of appropriate length is secured to the device.

Bottles 78 thus travel in the direction of arrow 71 until they reach the sprocket 74a from whence they will be removed onto the conveyer belt 77 by means of the second transverse member 75a. To prevent possible dislodgment of bottles 78 before reaching the conveyer belt at that point it has been considered advisable to provide an apron 72a.

Lamp sockets 110, while in engagement with the charge rails 113, 114 are protected by a housing 121 which also contains the conventional transformer 122 (Fig. 9). The turret 81 is driven by gears 123, 124 (Fig. 2). Shaft 125 of gear 124 may be connected to a suitable driving means, such as, for example, an electric motor (not shown) or it may be connected to intermediate transmission means in turn connected to the driving means of the conveyer belt 77, thus assuring a speed synchronized thereto. When applying the invention to the sterilization or other like treatment of bottles in the process of being washed or the filling machine, or both. The bottles may be sterilized before being filled, or while being filled, or after being filled and before being capped, or during two or more such operations.

Reference will now be made to Figs. 11 to 15 inclusive, illustrating multiple-walled tubes. Figs.

11 and 12 show a main fluid passage tube 210 surrounded by a secondary tube 211. Tube 211 completely seals a space 212. Electrodes 213, 214 enter space 212 at its two opposite ends. Fig. 11 discloses the electrodes 213, 214 at opposite ends on the same side of tube 211, but it is to be understood that the electrodes may be disposed at diagonally opposite ends of tube 211 or otherwise. Mercury droplets 215 of the required amount and the required gas or gases are enclosed in space 212 for a purpose well known in ray-emitting lamps. In some instances it may be advisable to coat the inside of the wall 211 with a suitable reflecting medium 216, for directing and concentrating the rays emitted from tube 211 toward the inner fluid passage tube 210. The fluid in passing through tube 210, is treated by the rays emitted from tube 211. Where tube 211 has bactericidal qualities, the bacteria, etc., in the fluid passing through tube 210, are killed.

Figs. 13 and 14 show a construction similar to that shown in Figs. 11, 12, except that a third jacket or tube 217 is provided to accommodate additional fluid or substance to be irradiated through inlet and outlet nozzles 218, 219. In this instance, the central passage tube 220 has sealed thereto the secondary ray-emitting tube 221 provided with electrodes 213, 214; the external jacket 217 being sealed to wall 222 of secondary tube 221. It is again to be understood that a plurality of these tubes may be connected together in any suitable manner and by any suitable means.

The tubular device shown in Fig. 15 is similar in construction to the device shown in Fig. 11, except that it is substantially rectangular, oval or elongated in cross-section. This device may be straight along its length or provided with a plurality of corrugations 223, thus increasing the effective length of the fluid passage through the device within a relatively short length thereof, and of course, thus increasing the active area of treatment of the lamp tube. It is understood that either the inner tube 224 or the outer tube 225 may be the fluid passage tube in which instance the remaining tube 224 or 225 will be the ray-emitting tube.

It is understood that the foregoing tubular devices may be circular, oval, or rectangular in cross-section, or spiral, ribbon-like, corrugated or straight; or of any other desirable configuration. Also, that the said tubular devices may be adapted for containing passageways for any desirable fluid, such as, for examples, milk, wine, water, creams, gas; or for powder, crystals, grains, or any other substance to be irradiated.

It is further contemplated herein that any number of co-axial or concentric ducts or tubes for respectively containing the ray-emission means and the substance to be irradiated may be employed; or a plurality of individual tubes or ducts may be arranged whereby the ray-emitting ones are dispersed amongst those containing the substance to be irradiated, in any desired manner, the whole system being united in a manner similar say, for example, to tubes or ducts in a boiler, condenser or the like, but, if desired, with provision for unidirectional flow or return for continuous irradiation. Fig. 19 generally indicates, diagrammatically by way of example, such a system, wherein the ray-emitting tubes or ducts are represented by the letter R, and the tubes or ducts containing the substance to be treated by irradiation are represented by the letter L. In Fig. 19, the letter T represents the casing for these tubes or ducts.

Where ray penetration is not required or necessary beyond the outer extremity of the ray-emission device, the said outer extremity may be made of a material impervious to the rays, or may be provided with a suitable reflective coating to reflect the rays (which would be otherwise lost) inwardly, and thus increase the intensity of irradiation, as well as furnishing a protective medium for persons in its vicinity. Such a coating is indicated in Fig. 11 by the numeral 216 and in Fig. 19 by the letter Rf.

Any suitable means, such as, gravity, suction, compressed air, etc., may be employed to impart continuous movement to the substance to be irradiated, when desired.

The tubular devices illustrated in Figs. 11 to 15 inclusive, and Fig. 19 are adaptable for many different uses, such as, for example, when it is desired to pasteurize milk while in transit from the milk-producing farm to the bottling plant. It is obvious that this procedure will save a great deal of time otherwise consumed where the milk is pasteurized after the track has delivered the milk to the plant. As illustrated in Figs. 16, 17, the conventional milk tank-truck is provided with the tank 227 secured to a conventional frame 228. A circulating pump 229 will pump the milk, during transit, through a plurality of tubes 231, which may be similar in construction to those shown in Figs. 11 to 15 or 19, thus practically eliminating all harmful bacteria and other organisms from the milk before the truck reaches its destination.

Fig. 18 illustrates a plant similar to that shown in Fig. 16, except that it is of a stationary construction. In this case, the tank 235 contains the fluid 236 to be pasteurized, sterilized, irradiated or otherwise treated. Within tank 235, a header 237 is suspended by a bracket 238. A plurality of tubes 239 which may be similar to the ones described in Figs. 11 to 15, are suspended from header 237 to within a short distance of the floor 240 of the tank 235. The fluid 236 reaches a pump 241 through a suction pipe 242. From pump 241 the fluid enters header 237 through a piping arrangement 243. Thus, a continuous flow will be provided for the fluid for any desired length of time.

From the foregoing it is seen that there has been provided by this invention ray-emission and irradiation means and devices, in which the various objects hereinabove set forth, together with many thoroughly practical advantages, are successfully achieved.

Having thus described my invention what I claim as new, and desire to be secured by Letters Patent, is:

An apparatus for irradiating containers, comprising an endless conveyer comprising a plurality of connected links, each of said links being provided with a guide hole and a recess surrounding said hole, a vertically-disposed plunger slidable in said hole, said plunger having a roller at its lower end and a platform at its upper end, said platform being adapted to support a container to be irradiated, said platform being receivable in said recess when said plunger is at its lowermost position, an endless track disposed below said conveyer and having an undulatory surface, said roller being in continuous engagement with said surface, an endless carrier disposed above said conveyer; said carrier being provided with a plurality of connected members, at least one of said members carrying a pair of downwardly-disposed spaced guide rods and a ray-emission lamp disposed between said rods, a guide element slidable on said guide rods, said element having an opening and a recess communicating with said opening, said latter-mentioned recess being adapted to receive the upper end of a container when positioned on said platform, the portion of said surface of said track below said element being raised, said element being slidable upwardly on said guide rods by said container during upward movement of said plunger when said plunger is brought to a position in vertical alinement with said element whereby said lamp may project within said container to irradiate said container, means for energizing said lamp, and means for driving said conveyer and said carrier in unison.

GEORGE G. ELLNER.

REFERENCES CITED

The following references are of record in the file of this patent:

UNITED STATES PATENTS

| Number | Name | Date |
| --- | --- | --- |
| 1,140,819 | Henri | May 25, 1915 |
| 1,198,356 | Keyes | Sept. 12, 1916 |
| 1,339,675 | Snelling | May 11, 1920 |
| 1,965,947 | Prouty | July 10, 1934 |
| 2,056,641 | Zecher | Oct. 6, 1936 |
| 2,132,431 | O'Brien | Oct. 11, 1938 |
| 2,194,463 | Powley | Mar. 26, 1940 |
| 1,297,525 | Wood | Mar. 18, 1919 |
| 1,813,021 | Brown | July 7, 1931 |